Dec. 26, 1972  R. ROBERTS  3,707,428
SEALING APPARATUS FOR MANUFACTURING ROLLER
COVERINGS, VESSEL LINERS AND THE LIKE
Filed July 24, 1970  4 Sheets-Sheet 2
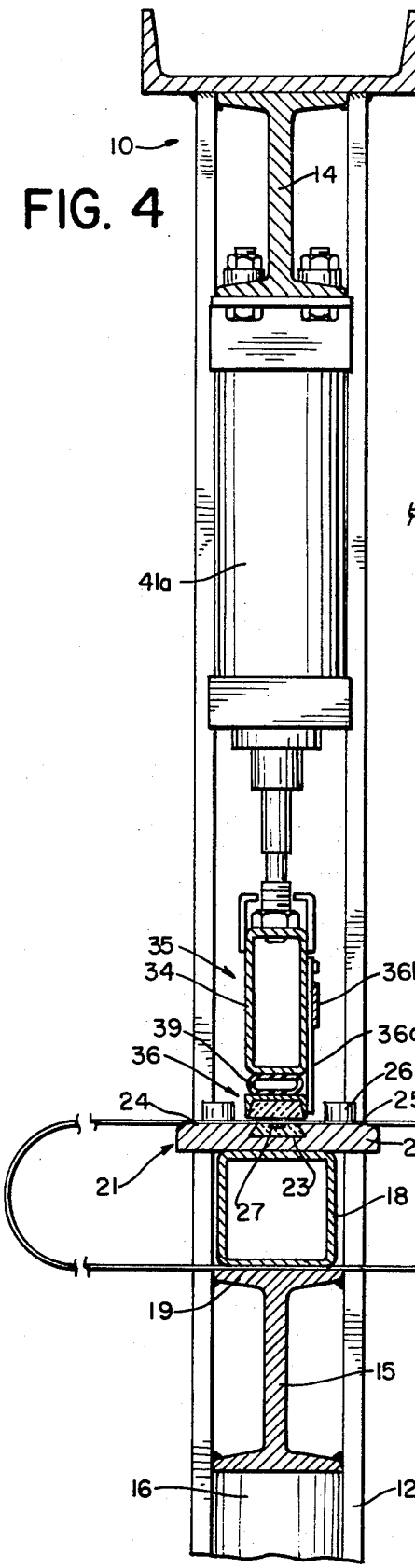
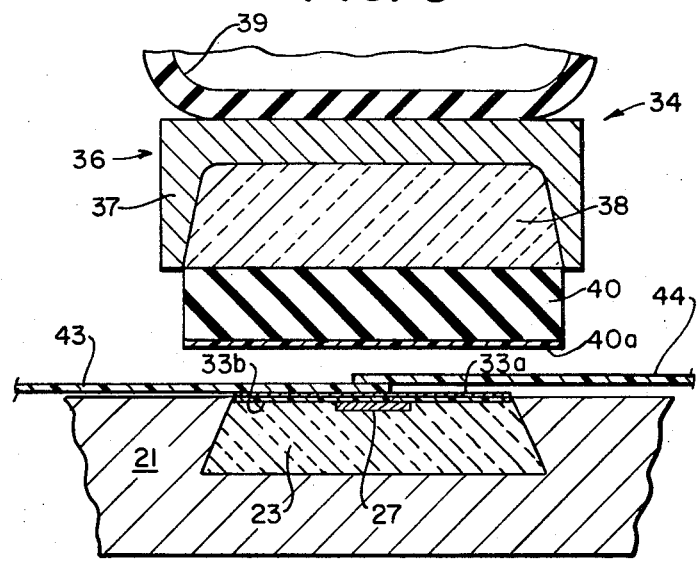
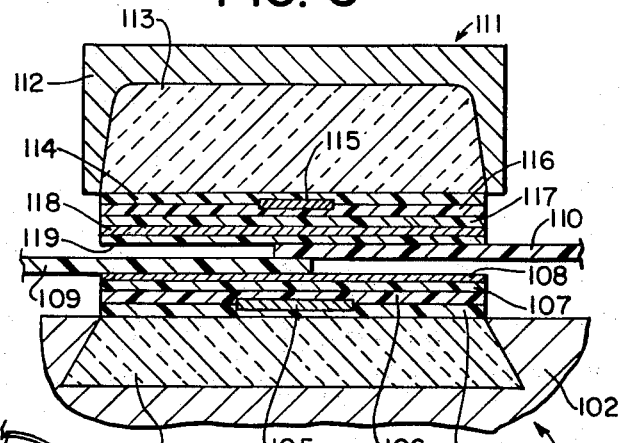
INVENTOR.
ROBERT ROBERTS
BY
Mandeville & Schweitzer
ATTORNEYS Dec. 26, 1972    R. ROBERTS    3,707,428
SEALING APPARATUS FOR MANUFACTURING ROLLER
COVERINGS, VESSEL LINERS AND THE LIKE
Filed July 24, 1970    4 Sheets-Sheet 3
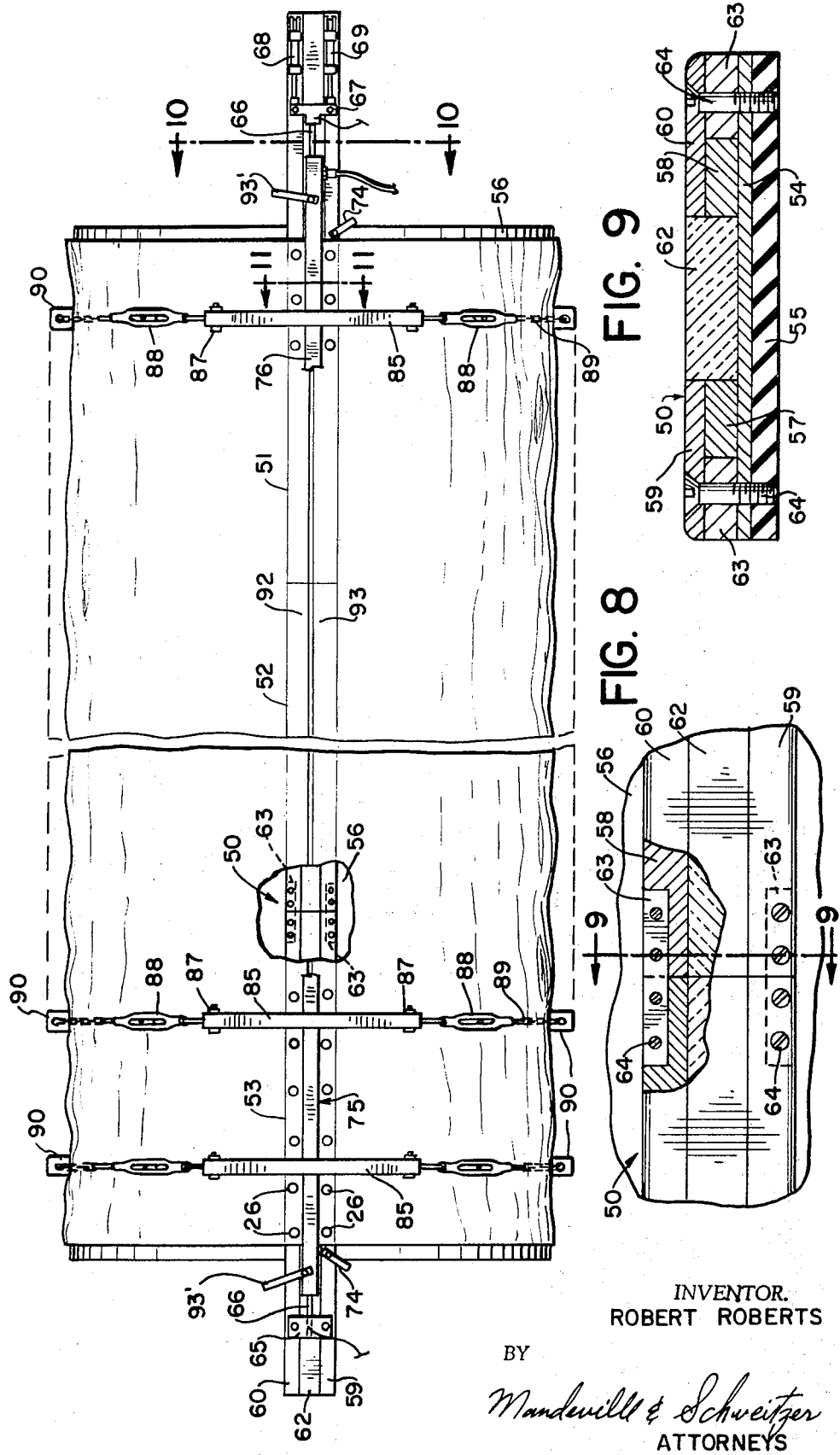
INVENTOR.
ROBERT ROBERTS
BY
Mandeville & Schweitzer
ATTORNEYS

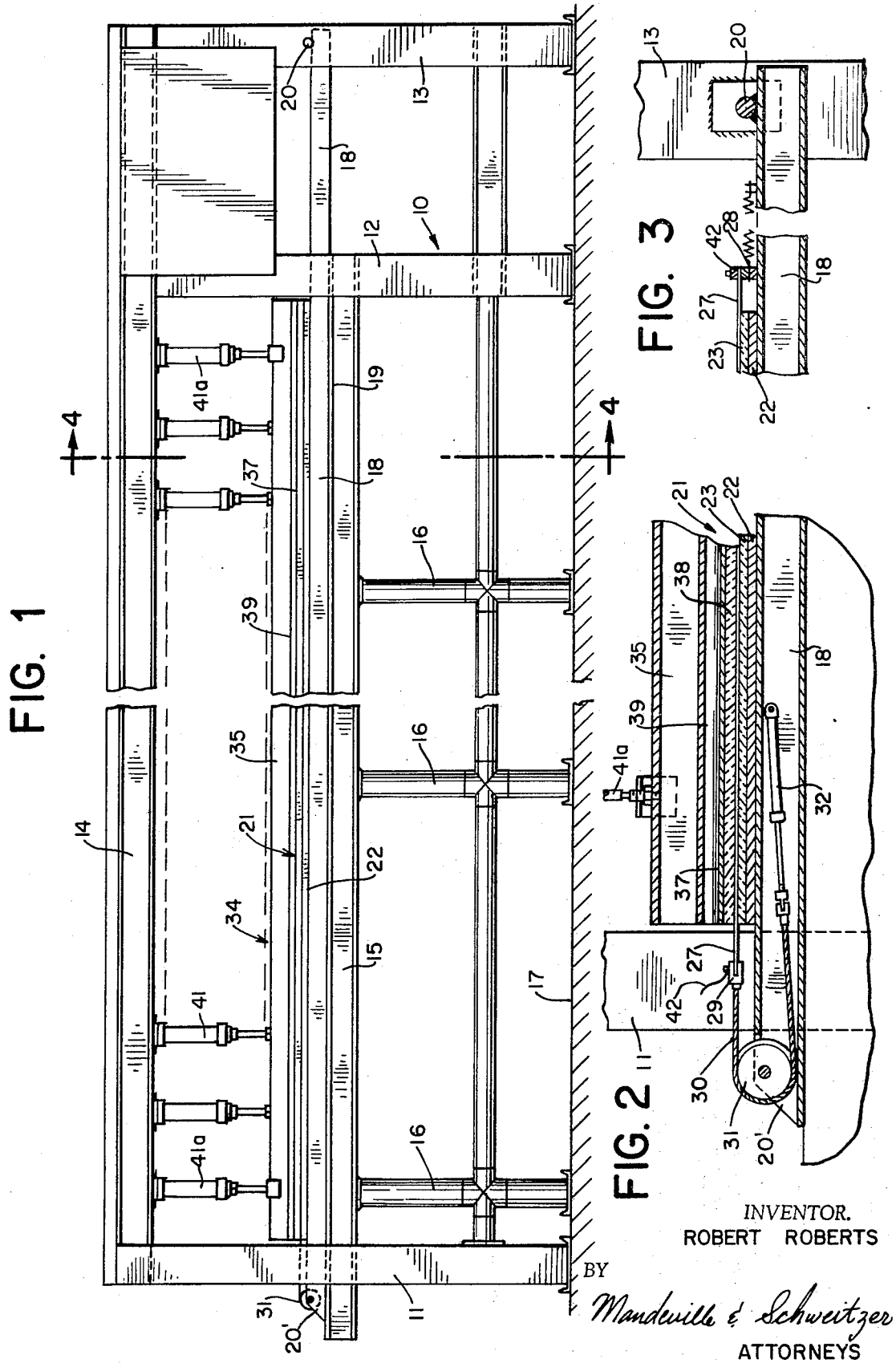

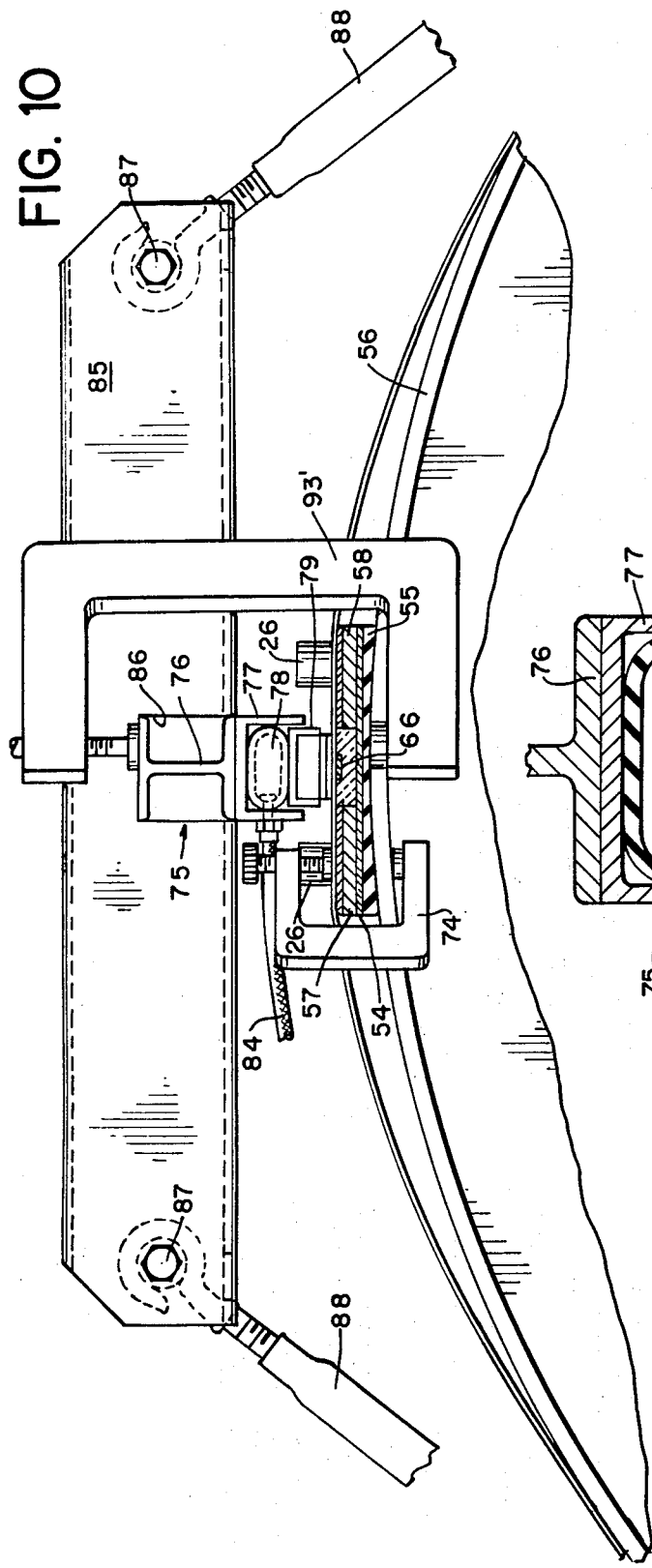
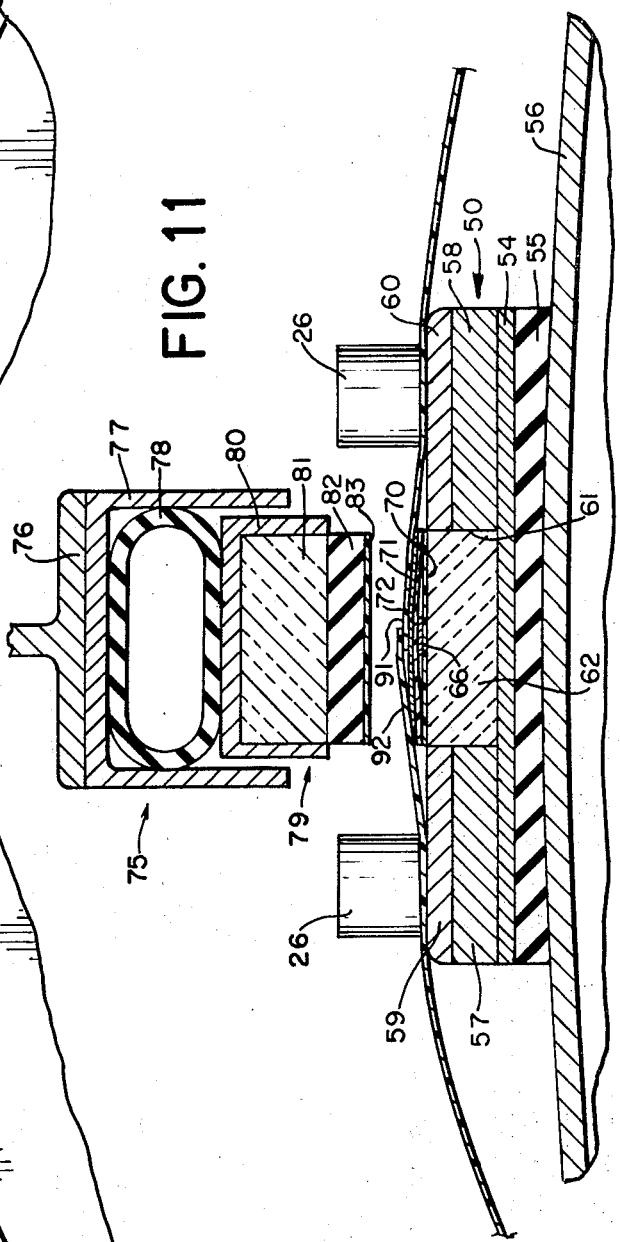

United States Patent Office 3,707,428
Patented Dec. 26, 1972

3,707,428
SEALING APPARATUS FOR MANUFACTURING ROLLER COVERINGS, VESSEL LINERS AND THE LIKE
Robert Roberts, Wilmington, Del., assignor to Fluorodynamics, Inc., Newark, Del.
Filed July 24, 1970, Ser. No. 58,052
Int. Cl. B30b 15/34
U.S. Cl. 156—583   9 Claims

ABSTRACT OF THE DISCLOSURE

The application is directed to a bar sealer apparatus for making elongated heat-fused seams between two sections of thermoplastic material, especially high molecular weight, high viscosity materials such as fluorinated ethylene polymers (e.g., Teflon FEP). The apparatus of the invention is designed especially for use in connection with the manufacture of heat shrinkable tubular roller coverings, vessel liners, and the like by securing together, by heat fusion, the opposite ends of webs of thermoplastic covering material. The heat-fused joints required for the purposes contemplated are of great length and are required to be of exceptional uniformity throughout. The new apparatus accommodates these severe requirements by, among other things, incorporating special provisions for the application of uniform pressures throughout the entire area of fusion. Novel arrangements are provided for the accommodation of extraordinary expansion and contraction in certain elements of the apparatus, particularly the heating element. The basic features of the new apparatus may be incorporated to advantage in the construction of an in-plant sealing apparatus, or in an in situ apparatus which enables the fusion to be made while the covering material is installed on the roller to be covered. The invention is useful to great advantage in the joining of webs of substantial thickness (e.g., 20 to 90 mils).

RELATED APPLICATIONS

The present application is related in its subject matter to the copending application of Robert Roberts, Ser. No. 57,997, filed July 24, 1970. It also is related to and constitutes an improvement over the subject matter of U.S. Pat. No. 3,426,118, which is owned by the assignee of the present application.

BACKGROUND AND SUMMARY OF THE INVENTION

It is known to be advantageous in many instances to manufacture process roller coverings, vessel and pipe liners, etc., of special materials, such as fluorinated ethylene polymers, to improve surface characteristics. One advantageous known material for this purpose is Teflon FEP 160, produced by Du Pont. For the covering of small diameter rollers, for example, or the preparation of small diameter liners, it may be suitable and advantageous to utilize film such as Teflon FEP which has been extruded in tubular form in the first instance. For use as a roller covering, such a tubing can be expanded circumferentially (and thereby rendered heat-shrinkable) and subsequently applied endwise over the roller. The tubing may then be shrunk into tight fitting relation to the roller and also secured thereto by appropriate adhesives if necessary or desirable. In cases where the tubing exceeds about eight inches or so in diameter, however, it becomes difficult and impractical to produce the covering film by extrusion in tubular form. In such cases, it is expedient, and in many cases necessary, to produce the film in web form and subsequently manufacture the tubing by cutting the web to appropriate size and fusing the ends thereof together to form a tube. The present invention is directed to improvements in equipment for effecting the fusion of the web-form film into an appropriate tubular form.

In the case of some particularly large process rollers, such as paper machine dryers, textile dryers and the like, physical removal of the process roller from its journals, in order to provide access for endwise installation of the covering film, may not be practical. In such cases, a web-form film of covering material is wrapped circumferentially about the process roller, and the fusion of the web ends is accomplished in situ. The basic features of the present invention are applicable to either in situ fusing operations, for large rollers, or in-plant operations for smaller rollers, vessel and pipe liners, etc.

In accordance with one aspect of the invention, a novel and improved apparatus is provided for effecting heat fusion of high molecular weight, high viscosity thermoplastic materials along a highly elongated seam, such as may typically be encountered in the manufacture of coverings for long processing rollers or deep vessels. To this end, the apparatus of the invention includes specific provision for the application of pressure with exceptional uniformity along the entire length of an elongated seam, so that heat may be applied uniformly to the seam along its entire length. This exceptionally uniform pressure is realized in the apparatus of the invention, by the provision of at least two and preferably three pressure distributing media, arranged in series. The arrangement is such that each pressure applying medium, in succession, further distributes the pressure application along the seam, providing the desired exceptional uniformity at the interface to be fused. The provision of such extraordinary uniformity of pressure application along the full length of the seam to be used is of particular importance, in that it enables a highly uniform conductive flow of heat into the joint from a heat source extending alongside. Significant variations in pressure from point to point along the seam, result in variations in the rate of conduction of heat, which manifests itself in the melting through of the material in some areas and inadequate fusion in other areas.

In accordance with another specific feature of the invention, a novel and improved apparatus is provided for effecting a heat fusion of a highly elongated seam of thermoplastic film, utilizing as a heat source an elongated ribbon of Nichrome or the like disposed in immediate heat conductive relation to the joint. The apparatus of the invention incorporates means for placing and maintaining the heating element ribbon under tension and thereby absorbing the significant thermal expansion of the ribbon relative to the thermoplastic material to be fused and also relative to the basic structure of the fusing apparatus. By thus absorbing the differential expansion of the Nichrome ribbon, localized distortions and pressure points, which would prevent obtaining a satisfactory seam, are reliably avoided.

Apparatus according to the invention, adapted for in-plant operation, is so constructed as to accommodate the formation of fusion seams of any length, up to a predetermined capacity. The apparatus intended for in situ formation of the fusion seam, while incorporating the same principles of operation as the inplant equipment, is, as a further feature of the invention, of a modular construction arranged quickly to be assembled into a variety of suitable lengths for use in conjunction with installed processing rollers of various axial lengths.

For better understanding of the invention, reference should be made to the following detailed description and to the accompanying drawings.

DESCRIPTION OF THE DRAWINGS

FIG. 1 is an elevational view of an apparatus according to the invention intended for in-plant prodution of heat-fused seams.

FIGS. 2 and 3 are enlarged fragmentary views of portions of the apparatus of FIG. 1 illustrating certain details of construction.

FIG. 4 is a cross-sectional view taken generally along line 4—4 of FIG. 1.

FIG. 5 is an enlarged fragmentary cross-sectional view illustrating certain details of the apparatus of FIG. 1.

FIG. 6 is a view, similar to FIG. 5, illustrating a modified form of the new apparatus, adapted especially for the fusing of heavy gage films.

FIG. 7 is a top plan view of an installed processing roller having associated therewith an apparatus according to the invention for the in situ production of heat-fused seams especially for process roller coverings.

FIG. 8 is an enarged fragmentary view of a portion of the apparatus of FIG. 7 illustrating details of its construction.

FIG. 9 is an enlarged cross-sectional view taken generally along line 9—9 of FIG. 8.

FIG. 10 is an enlarged fragmentary cross-sectional view taken generally along line 10—10 of FIG. 7.

FIG. 11 is an enlarged fragmentary cross-sectional view taken generally along line 11—11 of FIG. 7.

DESCRIPTION OF PREFERRED EMBODIMENTS OF THE INVENTION

Referring now to the drawing, and initially to FIGS. 1–5 thereof, the reference numeral 10 designates generally a machine frame of rigid construction. The illustrated frame includes pairs of main vertical beams 11–13 supporting main upper and lower structural beams 14, 15. All of the structural elements 11–15 may be of relatively heavy configuration for substantial strength and rigidity. Additionally, the structure advantageously includes a plurality of structural elements 16 extending between the lower I-beam 15 and the supporting foundation 17, providing vertical support for the beam 15 across the span between the main vertical supports 11, 12. In a typical production device, the lower beam 15 may have a span of 20 feet or more, between the main supports 11, 12 and sufficient intermediate supports 16 are provided to prevent excessive downward deflection of beam 15 under a substantial vertical load, as will appear.

As is reflected more clearly in FIG. 4, a secondary beam 18, desirably of rectangular tubular cross-section, rests upon the upper flange 19 of the lower structural beam 15, extending along the full working length thereof and projecting beyond, to the main vertical support 13. The tubular beam 18 is pivotally supported at 20 by the structural beam 13, and so can be raised off of the lower structural beam 15 by raising the free end 20', shown at the left in FIG. 1.

Supported on the tubular beam 18, and suitably secured thereto, is a lower clamping plate assembly 21 (FIGS. 4 and 5). The clamping bar assembly 21 includes an elongated flat plate 22, which extends along the full working length of the tubular beam 18. The plate 22 has a dove-tailed recess extending longitudinally along its upper surface, in the center of the plate, and this recess is filled with a relatively hard, thermal insulating material, such as Marinite. This inlay 23 of insulating material forms the principal clamping area of the bar assembly 21. However, the plate 22, which is formed of a magnetic material, typically steel, is provided with laterally extending holding areas 24, 25 on each side of the insulating inlay. As will be further described, these holding areas receive magnetic or mechanical holding elements 26 enabling sections of film to be temporarily held in place and properly positioned prior to final clamping and sealing.

In accordance with one aspect of the invention, an elongated, ribbon-like heating element 27 is supported on the upper surface of the insulating inlay 23. If desired, the inlay may be recessed slightly to receive the heating element, but this may not be necessary in many instances, as the heating element typically is quite small (e.g., 5 mils in thickness by ¼ inch in width). As a significant feature, however, the heating element 27 extends continuously throughout the full working length of the apparatus so that, for any sealing operation up to the maximum capacity of the equipment, a continuous, full length heat source is available.

The heating element 27 most suitable for the purposes of the invention is a "ribbon" of electrically resistive material having an extremely low coefficient of linear thermal expansion. The ribbon may have a thickness of about 5 mils and a width of about ¼ inch. Materials such as "Nichrome," "Nichrome V" and "Nilvar," made available by Driver-Harris Company, Inc., Harrison, N.J., are particularly suitable. "Nichrome" is an alloy comprising, principally, about 60% nickel and about 16% chromium. "Nichrome V" is a nickel-chromium alloy comprising about 80% nickel and about 20% chromium. "Nilvar" is a nickel-iron alloy comprised principally of about 35% nickel and about 65% iron.

At its intended working temperatures (over 600° F.) the linear expansion of the Nichrome ribbon 27 still is substantially in excess of the thermal linear expansion of the related components of the clamping plate assembly 21, and also of that of the materials being processed. Accordingly, as an important feature of the invention, the Nichrome ribbon 27 is supported to have freedom of linear movement relative to the remainder of the clamping plate assembly 21, and the apparatus is provided with means for applying to the ribbon a sufficient degree of longitudinal tension to fully absorb the thermal linear expansion of the ribbon and keep it free of wrinkles and other deformities. To this end, the apparatus of FIGS. 1–5 includes a suitable spring-mounted clamp 28 (FIG. 3) which engages one end of the heating element and yieldably secures it to the tubular beam 18. At its other end, the Nichrome element 27 is engaged by a movable clamp 29 attached to a tensioning cable 30. The cable 30 passes around a sheave 31, appropriately journaled at the free end of the tubular beam 18, and is connected to a fluid actuator 32 advantageously housed within the tubular beam 18. The actuator 32 is controllably operated (by conventional means not shown) to apply tension to the heating element 27 when and as desired.

Advantageously, the active clamping surface of the lower clamping plate assembly 21 comprises a thin (e.g., 10 mils) foil 33a of low thermal expansion metal, such as Invar. Invar is a proprietary nickel-iron-based alloy produced by International Nickel Co., Inc. and containing about 36% nickel. Directly underneath the Invar foil 33a and underlying the Nichrome heating element 27, is a polyimide film (typically Kapton film 33b made available by Du Pont). The film 33b may be on the order of 5 mils in thickness. The Invar foil 33a and Kapton film 33b may have a width of an inch or so extending well beyond the lateral limits of the Nichrome heating element 27, and also extending the full length of the fusion seam to be formed. The Kapton film is suitably heat conductive to transfer the heat of the Nichrome heating element 27 to the Invar foil 33a and the presence of the foil causes the heat to have a desirable distributable pattern in the region of the seam to be formed. The Invar foil not only has desirable thermal expansion characteristics at the working temperatures of the equipment, but also has adequate release characteristics to prevent bonding thereof to the processed materials during a sealing operation.

An upper clamping assembly, designated generally by the reference numeral 34, includes a backing element 35 in the form of a relatively rigid tubular beam. The beam 35 desirably is of rectangular cross-section, having substantial vertical depth (see FIG. 4) whereby substantial vertical forces may be imparted thereto with a minimum of vertical deflection. A relatively flexible clamping element 36 extends along under the tubular beam 35 and is loosely connected thereto by a plurality of slide bars 36a having limited vertical movement in guides 36b secured to the side walls of the tubular beam 35.

Interposed between the rigid beam 35 and the flexible clamping element 36 is an elongated, fluid-inflatable pressure distributing element 39. The element 39 advantageously is constructed of fabric reinforced rubber, neoprene or other suitable elastomer; it is arranged to lay flat when deflated and tends to become circular in cross section when pressurized. The principal elements of the upper clamping plate assembly, the tubular beam 35, the pressure distributing element 39 and the clamping element 36 extend over the full working length of the apparatus, as shown in FIG. 1, for applying pressure along the full length of a fabricated seam.

Advantageously, the clamping bar 36 may comprise a shallow channel 37 having its flanges facing downwardly to form a cavity for the reception of an inlay 38 of thermal insulating material, such as Marinite. Secured to the face of the insulating inlay is a pad 40 of resilient material, such as silicone rubber, which is relatively resistant to thermal degradation at the contemplated temperatures of operation and may have a thickness on the order of ¼ inch. A layer 40a of polyimide (Kapton) film is adhesively secured to the lower face of the silicone rubber pad 40 and provides an operating clamping surface positioned in opposed relation to the Invar foil 33a of the lower clamping bar assembly. The width of the film 40a is such that it extends laterally on each side of the heating element 27 by a substantial margin. The arrangement is such that the Invar foil 33a and Kapton film 40a span and confine the entire region of thermoplasticity developed during a normal seaming operation.

A plurality of fluid actuators 41 extend between the upper beam 14 of the frame structure and the tubular beam 35 of the upper clamping bar assembly. Typically, there is a fluid actuator provided about every 12 inches along the full length of the tubular beam 35, arranged such that when the actuators are extended by the application of fluid pressure, downward pressure is applied to the tubular beam 35 for effecting one stage of the clamping action. At least some of the actuators (41a) are of the double-acting type and can be retracted for raising the upper clamping bar assembly 34 bodily away from the lower bar assembly 21. The remaining fluid actuators need only be single acting, arranged to exert downward pressure upon the clamping bar assembly 34 and being retractable by the action of the double-acting units.

In the production of a fused seam, utilizing the apparatus of FIGS. 1-5, the two end sections of thermoplastic film to be fused are first brought together in the area of the clamping bar assemblies. In the context of the present invention, this most typically will be the opposite ends of a single length of fluorinated ethylene polymer film (e.g., Du Pont's Teflon FEP 160) having a thickness of, say, 20 mils. When the film is to be fused to form a section of tubing, provision is made for the return passage of the film underneath the lower clamping bar assembly 21. This is accommodated by lifting the free or left hand end of the tubular beam 18 and passing the film between it and the supporting structural beam 15. The tubular beam 18 is then lowered down onto the beam 15, being supported thereon through the intermediate presence of the film, as reflected in FIG. 4.

In the initial set-up of the film sections for fusing, the end sections are positioned one at a time in proper alignment, over the Nichrome heating element 27. In conjunction with this initial alignment, there may advantageously be employed a substantial plurality of mechanical or magnetic holding units 26; magnetic units can be either electromagnets, permanent magnets, or perhaps some of each. This enables the workman to position an elongated (e.g., 20 feet) section of film very precisely over the heating element, keeping the film free of all wrinkles and distortions. After properly positioning one side, the other side is positioned in a similar fashion. In some cases, the films may be simply butted together on their free edges, or they may be overlapped slightly, as desired. Where the films are overlapped, as shown at 43, 44 in FIG. 5, one-sixteenth to one-eighth inch of overlap is usually sufficient.

After the films are properly positioned and overlapped, but before clamping pressure is applied, the heating element 27 is energized through suitable electrical connections 42. The temperature of the element is brought up to the desired level (600–630° F. for the fusing of Teflon FEP) as determined by a thermocouple element (not specifically shown) welded or otherwise secured in contact with the heating element. Typically, the heating element is up to temperature in around 30 seconds. Thereafter, the tension cylinder 32 is actuated and sufficient longitudinal tension is applied to the heating element to effect elongation thereof and remove all wrinkles and distortions resulting from the initial thermal elongation. Fluid pressure is now simultaneously applied to all of the fluid actuators 41, 41a, moving the upper clamping bar assembly downward and causing the beam-like element 35 to be disposed in its primary clamping position.

As will be appreciated, fluid pressure applied to the upper clamping bar assembly through the actuators 41, 41a is applied at spaced, discrete points spaced about 12 inches apart. Notwithstanding the rigid nature of the tubular beam 35, this arrangement would tend to cause a wave-like variation in clamping pressure along the length of the seam, which would have undesirable consequences in the case of the thermal seaming of sensitive material, such as Teflon FEP 160. This is avoided in accordance with the present invention by the interposition of the elastomeric pressure distributing element 39, which extends continuously throughout the effective length of the upper clamping bar assembly, between the rigid beam 35 and the flexible clamping bar 36. Following pressurizing of the actuators 41, 41a, the elastomeric pressure distributing element 39 is inflated by an appropriate pressure fluid (usually air). The final, uniformly distributed clamping pressure is determined through controlled inflation of the pressure distributing element 39. Alternatively, the element may be "pre-loaded" to a desired pressure level. In either case, the clamping pressure is applied through the distributing element 39, the flexible clamping bar 36 and the resilient pad 40, providing the highest order of uniformity of clamping pressure throughout the full length of a highly elongated seam. This has been found to be of critical importance in the fusing of high molecular weight, high viscosity polymers, such as Teflon FEP.

A satisfactory fused seam of Teflon FEP is produced in the apparatus of the invention by maintaining the heating element energized at a temperature of 600–630° F. for at least about 15 minutes, while the film is under clamping pressure. Thereafter, the heating element is de-energized, but clamping pressure is maintained until the thermocouple element indicates that the film temperature has been reduced to a level of around 200° F. or less. Particularly for thin (e.g., 10 mils) films of Teflon FEP 160, there may be a tendency for the immediate region of the fused joint to be slightly thinner than the adjacent film. This may be accommodated, however, with the apparatus of the invention because the tendency for the silicone rubber pad 40 to expand thermally effectively compensates for any tendency of a thin film to become thinner in the region of fusion, and a uniform clamping pressure is maintained.

If the finished product is in tubular form, the completed tube is removed endwise over the tubular beam 18, sliding the tube between the spaced elements of the vertical structural support 11.

For the joining of heavy gage films (e.g., Teflon FEP films of 60 to 95 mils) certain modifications are advantageously incorporated in the apparatus of the invention. In particular, it is advantageous to provide a heat source in the form of a Nichrome or similar ribbon both above and below the seam. An advantageous arrangement for this purpose is illustrated in FIG. 6.

In the apparatus of FIG. 6, a lower clamping plate assembly 101 comprises a plate 102 having an insulating insert 103 of Marinite or the like running the full length of the region in which the seam is to be formed. Supported on the Marinite insert are, in the order indicated, a film 104 of Kapton, a Nichrome or similar heating element ribbon 105, superimposed Kapton films 106, 107 and a foil 108 of Invar. The Invar foil constitutes the upper surface of the assembly, and on it rests the film ends 109, 110 of the heavy gage material.

The upper clamping bar assembly 111 of FIG. 6 apparatus includes a relatively flexible channel element 112 containing an insert 113 of Marinite. Secured to the lower surface of the Marinite in the order indicated are a Kapton film 114, a heating element 115 of Nichrome or similar material, Kapton films 116, 117 and Invar foil 118 and a Kapton film 119. Desirably, in the case of the upper clamping bar assembly 111, a film of polyimide is provided over the lower surface of the Invar foil 118 to enhance the release characteristics of the upper clamping bar. At least with high molecular weight materials such as Teflon FEP, the polyimide film exhibits superior release characteristics to the Invar foil and it is desirable to have these superior release characteristics for the upper bar, at least, to avoid any tendency for pick-up of the fused material at the end of an operation. The somewhat lower release characteristics of the Invar foil normally are satisfactory for the lower unit, as the fused film may be readily lifted off of the lower bar after opening of the apparatus at the end of an operation.

In the modification of FIG. 6, adapted especially for sealing heavy gage films, the silicone rubber pad 40 generally is not required to be provided, because of the inherent thermal expansion of the heavier gage films. Moreover, even for thinner films, it may be possible to omit the silicone rubber pad for in-plant operations, where ideal operating conditions are more readily obtainable. The pad is especially desirable, however, for in situ operations, at least where lighter gage films are to be joined.

The embodiment of the invention illustrated in FIGS. 7–11 is intended for in situ installation of coverings of large, cumbersome process rolls, such as paper machine dryer rolls, for example. For this purpose, the entire sealing equipment is designed to be installed on the roll, enabling the covering film to be wrapped around the roll in web form and then joined at its end edges to form the desired tubular roll covering.

For the in situ of field installation equipment, a lower clamping bar assembly 50 is provided which is of segmented construction, capable of being assembled to a length appropriate to the axial length of the process roll to be covered. Desirably, the individual clamping bar segments, reflected at 51–53 in FIG. 7, are provided in a variety of lengths so that, from a standard stock, a clamping bar assembly 50 may be assembled which will extend fully across the face of the roll and at least slightly beyond the ends thereof.

As reflected in FIG. 11, each segment of the clamping bar assembly 50 comprises a flat base plate 54 supported by a resilient pad 55. The pad 55 is adapted to be seated upon the surface of a roll 56 to be covered, adapting the flat plate 54 to the arcuate surface of the roll and also avoiding any scratching or marking of the roll. Spacer bars 57, 58 and cover plates 59, 60 are provided, extending longitudinally along each side of the base plate 54 and forming between them a recess 61 for the reception of an inlay 62 of insulating material such as Marinite. Typically, the insulating inlay 62 is arranged to have its upper surface flush with the upper surfaces of the cover plates 59, 60, and the inlay also extends directly to the end extremities of the clamping bar elements.

As reflected in FIG. 9, the spacer bars 57, 58 are recessed at each end to receive connecting elements 63. The connecting elements 63 are secured to the individual clamping bar sections by vertical bolts 64, so that the individual bar sections are rigidly clamped in end-to-end relation and in accurate alignment, presenting a flat surface over the entire length of the assembled clamping bar 50. In the arrangement illustrated in FIGS. 7–11, the assembled lower clamping bar 50 may conveniently be secured in place initially on the face of the roll 56 to be covered by means of suitable C-clamps 74.

At one end, the clamping bar assembly is provided with a gripping element 65 for securing one end of a Nichrome ribbon heating element 66 of the type described in connection with the apparatus of FIGS. 1–5. At the other end of the clamping bar assembly, there is a movable gripping element 67 which engages the opposite end of the Nichrome ribbon 66. The gripping element 67 is carried by a pair of fluid actuators 68, 69 which are mounted on the end extremity of the clamping bar assembly. As mentioned in connection with the previously described embodiment, the actuators 68, 69 may be energized at an appropriate time to apply longitudinal tension to the Nichrome heating element 66 and thus remove any wrinkles and distortions therefrom otherwise resulting from the thermal elongation thereof.

As reflected in FIG. 11, the completed lower clamping bar installation includes one or more layers 70 of polyimide (Kapton) film disposed in a continuous length over the entire working length of the clamping bar assembly. (By working length, it is meant the portions used in the formation of a fused joint.) The Nichrome heating element 66 is then disposed atop the polyimide film 70 and extends continuously along the working length of the clamping bar assembly, being secured by the grippers 65, 67 as described. Thereafter, one or more layers 71 of polyimide film and a layer of Invar foil 72 are disposed over the top of the heating element 66 and extend continuously along the working portion of the clamping bar assembly.

The completed clamping bar assembly 50 of the apparatus of FIGS. 7–11 functions in the same manner as described in connection with the lower clamping bar assembly 21 of the apparatus of FIGS. 1–5. However, since the roll covering is being formed at the site of the roll, rather than in the plant of the roll covering supplier, certain variations in installation technique may be desired. Reference may be made to the copending application of Robert Roberts, Ser. No. 57,997, filed July 24, 1970, for "Method for the In-Situ Covering of Large Diameter Process Rolls with Heat Shrinkable Films of Fluorinated Ethylene Polymers and the Like" for a description of advantageous techniques for in situ installation of such roll coverings.

The upper clamping bar assembly 75 includes a relatively rigid beam-like structure comprised of an I-beam or H-beam 76 secured to a downwardly opening channel beam 77. The channel 77 houses an inflatable elastomeric pressure distributing element 78 which extends along the full working length of the apparatus and bears downward upon a relatively flexible clamping bar 79. The clamping bar 79 may be similar in its construction to the clamping bar 36 of the FIGS. 1–5 apparatus, including a downwardly opening channel element 80 containing an inlay 81 of thermal insulating material. A resilient pad 82 of silicone rubber is secured over the bottom face of the insulating inlay 81, and a layer 83 of polyimide film is secured over the bottom face of the resilient pad and forms the working surface of the upper clamping bar assembly. The inflatable element 78 is suitably connected by a hose 84 to a source of pressure fluid and, as previously described, is controllably inflated as a means of applying clamping pressure during the installation procedure.

At spaced locations along the rigid beam-like element 75, say about every 12 to 18 inches, there are provided transversely disposed crossbar elements 85, typically in the form of tubular beams which are notched out at 86 to accommodate reception over the top of the beam-like structure 75. Desirably, the crossbar elements 85 extend transversely outward a distance of 12 inches or so from the center line of the beam 75, and they are provided at their end extremities with bolts 87 for the attachment of turnbuckles 88. The turnbuckles 88, in turn, engage chains 89 or similar flexible elements which extend circumferentially around the process roller 73 to be covered. The chains 89 are covered with suitable protective padding 90 where they come into contact with the surface of the roller or its covering.

In the installation of a roll covering utilizing the apparatus of FIGS. 7–11, the two film ends 91, 92 (FIG. 11) are first brought into the proper overlapping relation, directly over the Nichrome heating element 66 and are secured in place by mechanical or magnetic elements 26 spaced along the length of the clamping bar assembly 50. At this stage, the covering film is wrapped around the entire process roller 73 and the lower clamping bar assembly 50 as well.

At this stage, the upper clamping bar assembly is brought into position, and may initially be secured in place through the use of large C-clamps 93' at each end. The crossbar elements 85, which are removably associated with the beam structure 75, are then assembled in place at appropriately spaced locations along the length of the beam structure, and light clamping pressure may be applied by the use of turnbuckles 88.

While the film ends remain lightly clamped, the heating element 66 is energized and brought up to temperature. Thereafter, the actuators 68, 69 are energized to apply longitudinal tension to the heating element and draw out all of the thermally induced elongation thereof. Final clamping pressure is desirably applied by controlled inflation of the elastomeric pressure distributing element 78, rather than in individual manipulation of the various turnbuckles 88. In other respects, the operation corresponds to that of the in-plant equipment disclosed in FIGS. 1–5.

The in situ installation apparatus is easily assembled and disassembled at the site, capable of being compactly stored, shipped and handled. In the case of either the in-plant or the in situ fusing equipment, a reliably superior joint is provided, capable of consistently meeting the unusually severe requirements of the seams of process roller coverings. In part, this is realized by the use of a continuous length heating element, in conjunction with the provision of means for providing an unusually evenly distributed clamping pressure along the full length of the fused seam. In this respect, any significant unevenness in the distributed pressure will cause a greater transference of heat from the heating element in regions of higher pressure, and hot spots in the heating element in regions of lower pressure. This can result in the development of melted-through areas in the seam, rendering it unsuitable for its intended purpose.

In both the in-plant and in situ apparatus, the upper clamping bar assembly comprises a combination of a relatively rigid beam-like structure, movably associated with a relatively flexible clamping bar and incorporating a full length elastomeric pressure distributing element, which is controllably inflatable for highly uniform distribution of pressure from the rigid beam to the relatively flexible clamping bar. Support of the relatively rigid beam-like structure is provided, in the one case, by a large plurality of fluid actuators and, in the other case, by a plurality of flexible tension elements, such as chains, disposed circumferentially about the roll to be covered. The provision of the laterally extending crossbars in the in situ apparatus serves to increase the radially directed clamping force in relation to the circumferentially directed tensions. Further, by visual alignment of the several crossbar elements in the in situ equipment, precise orientation of the rigid beam structure is assured, and twisting or skewing thereof is reliably avoided.

Perhaps the most significant advantage of the apparatus is its ability reliably to achieve sound fusion joints in sensitive materials on a repetitive, commercial production basis. The invention is particularly useful in connection with high molecular weight, high viscosity thermoplastic materials, in both light and heavy gages. Examples of such materials are polyvinylidene fluoride ("Kynar"), high molecular weight polyethylene, polypropylene, nylon, Aclar, Tefzel, fluorinated ethylene polymers such as Teflon FEP 160, and the like.

In order to determine the full scope of the invention, reference should be made to the following appended claims.

I claim:
1. A continuous length sealer for effecting heat fusion of adjacent sections of thermoplastic film, which comprises,
   (a) a pair of longitudinally extending clamping bars,
   (b) means mounting one of said clamping bars for clamping and releasing movement toward and away from the other clamping bar,
   (c) said one clamping bar including an elongated longitudinally extending relatively rigid beam-like structural element,
   (d) means for applying clamping force to said beam-like structural element at a plurality of relatively closely spaced but discrete locations,
   (e) said one calmping bar further including an elongated, longitudinally extending relatively flexible clamping element carried by said beam-like structural element and movable relative thereto in clamping and releasing directions,
   (f) an elongated, fluid-inflatable pressure distributing element interposed between the structural and clamping elements for transmitting clamping pressure from the structural element to the clamping element, and
   (g) a narrow, elongated heating element extending longitudinally along one of said clamping bars adjacent the clamping surface thereof.
   (h) said heating element extending continuously for at least the entire length of the fused seam to be formed by the sealing apparatus.
2. The sealing apparatus of claim 1, further characterized by
   (a) said means for applying clamping force comprising a plurality of fluid cylinders acting on said beam-like structural element at spaced intervals along its length, and
   (b) said pressure distributing element comprising a pneumatically inflatable elastomeric element.
3. The sealing apparatus of claim 1, further characterized by
   (a) said one clamping bar further including a resilient clamping pad of heat resistant elastomeric material carried by the flexible clamping element for transmitting clamping pressure from the clamping element.
4. The sealing apparatus of claim 3, further characterized by
   (a) said apparatus being adapted especially for the joining of sections of fluorinated ethylene polymer webs,
   (b) the exposed clamping surface of the clamping bar containing said heating element being formed by a thin layer of polyimide film and an overlying foil of Invar, and
   (c) said heating element comprising a ribbon-like element of electrically resistant material disposed along one of said clamping bars in contact with and covered by the polyimide film layer.

5. The sealing apparatus of claim 1, further characterized by
   (a) said elongated heating element being movably associated with the clamping bar by which it is carried, and
   (b) means being provided in association with said last mentioned clamping bar for applying tension to said heating element in the lengthwise direction during heating thereof.

6. A sealing apparatus for joining by heat fusion sections of fluorinated ethylene polymer webs and the like, which comprises
   (a) a first elongated clamping bar assembly mounted in substantially fixed, substantially rigid relation,
   (b) a second elongated clamping bar assembly mounted for movement toward and away from the first for effecting clamping action,
   (c) means for transmitting clamping pressure to the clamping surface of said second clamping bar assembly comprising an elongated, fluid-inflatable elastomeric element extending along the entire effective length of the clamping bar assembly,
   (d) a relatively flexible, elongated clamping element urged in a clamping direction by said inflatable element.

7. The sealing apparatus of claim 6, further characterized by
   (a) said second clamping bar assembly including a relatively rigid beam-like element supporting said elastomeric element and said relatively flexible element,
   (b) means being provided for supporting said beam-like element at a plurality of locations.

8. The sealing apparatus of claim 7, further characterized by
   (a) the supporting means comprising a plurality of crossbar elements disposed at spaced locations along said beam-like element and extending transversely outward thereof on both sides, and
   (b) the supporting means further including band-like pressure elements connecting the ends of said crossbar elements and adapted to extend circumferentially about a roller or the like to be covered by the web material.

9. The sealing apparatus of claim 6, further characterized by said first clamping bar assembly comprising
   (a) a backing plate assembly comprising a plurality of separable backing plate sections connected end-to-end to a length exceeding that of the seam to be formed,
   (b) each of said plate sections having a block of thermal insulating material extending longitudinally therein from one end to the other, and being exposed along one surface,
   (c) means for detachably connecting said backing plate sections in end-to-end aligned relation,
   (d) an elongated ribbon-like heating element supported on the blocks of insulating material and extending in continuous form throughout a portion of the clamping bar assembly greater in length than the seam to be formed,
   (e) means securing said ribbon-like heating element adjacent its end portions,
   (f) at least one of said securing means being longitudinally movable relative to the bar assembly and adapted to apply longitudinal tension to said heating element, and
   (g) a continuous, longitudinal layer of polyimide film being disposed over the exposed surface of said heating element over at least the entire length thereof to be in contact with the web sections to be joined,
   (h) the connected-together plate sections being adapted to be rigidly supported by a roller to be covered by said web sections.

References Cited
UNITED STATES PATENTS
| | | | |
|---|---|---|---|
| 2,802,086 | 8/1957 | Fener | 156—583 |
| 2,646,105 | 7/1953 | Langer | 156—583 |
| 3,291,963 | 12/1966 | Wetzel | 156—583 |

DOUGLAS J. DRUMMOND, Primary Examiner